Sept. 16, 1969          H. O. LEVITT          3,467,307
SCALING AND CALCULATING INSTRUMENT
Filed Aug. 19, 1968
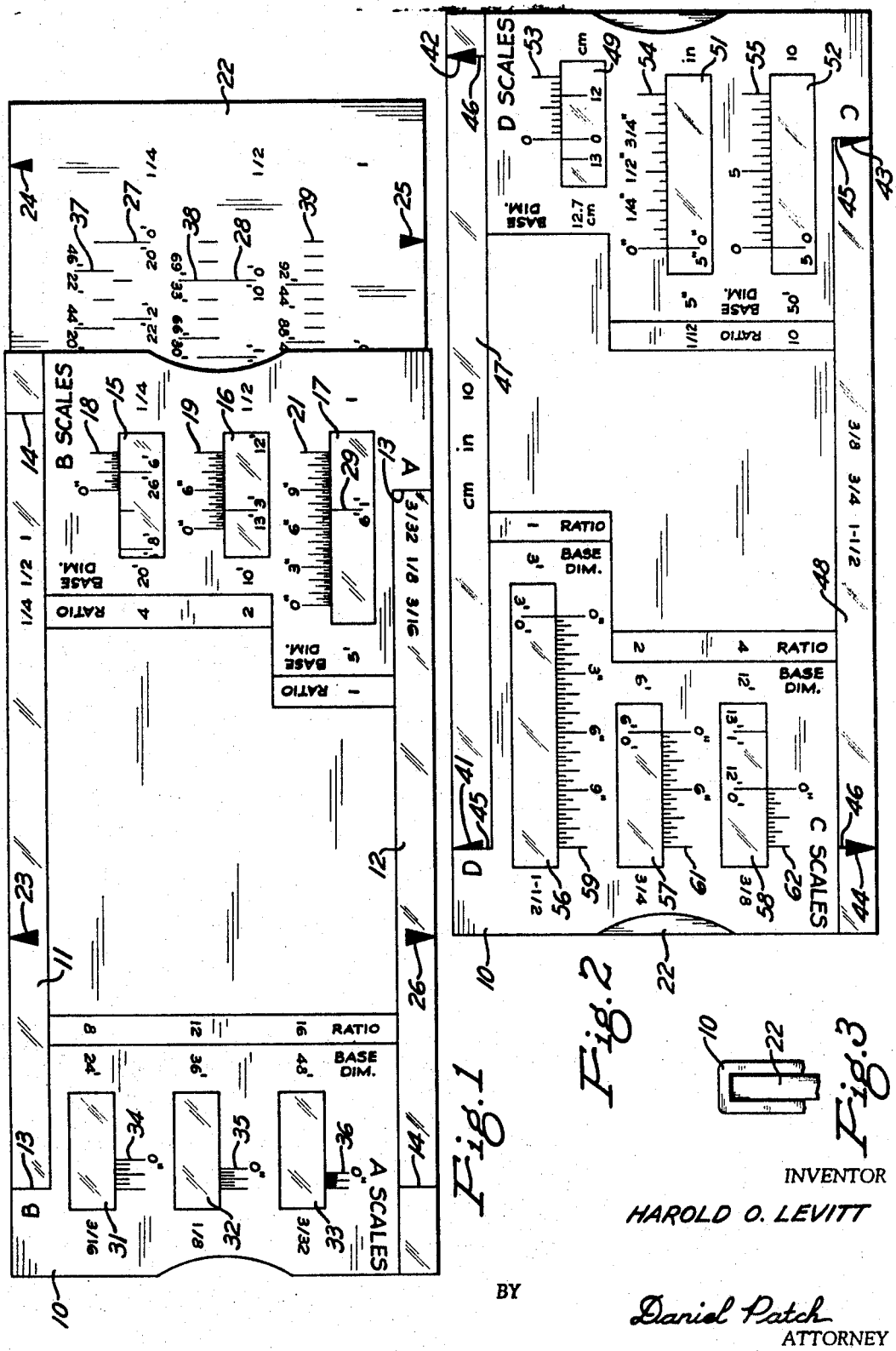
INVENTOR
HAROLD O. LEVITT
BY
*Daniel Patch*
ATTORNEY United States Patent Office 3,467,307
Patented Sept. 16, 1969

3,467,307
SCALING AND CALCULATING INSTRUMENT
Harold O. Levitt, % Daniel Patch, Esq., 1320 Rolling
Meadow Road, Pittsburgh, Pa. 15241
Filed Aug. 19, 1968, Ser. No. 753,491
Int. Cl. G06c 3/00
U.S. Cl. 235—89          8 Claims

ABSTRACT OF THE DISCLOSURE

The disclosure of this invention relates to a combination scaling and calculating instrument. The instrument comprises an open-ended, rectangularly shaped case which is adapted to receive a thin rectangularly shaped slide member. The case includes four transparent measuring windows located at the four longitudinal edges. With respect to each measuring window there is provided a set of three scale windows which are formed in the case. Thus, there are twelve scale windows; ten representing the often-used architect's scales and the remaining two representing a civil engineer's scale and a metric scale. In addition to the above-named windows, there are provided ratio and base dimension columns. The construction and arrangement of the windows with reference to the slide and the various printed scales and other data enables the instrument to be used to quickly and accurately perform a number of scaling and calculating operations, for example: obtain a dimensional value from a scaled drawing; mark off and rule a dimension onto a drawing; the addition, subtraction, multiplication and division of dimensional values in terms of the various scales; the conversion of such values to their metric and decimal equivalents; the conversion of values on the engineer's scale in terms of other engineer's scales; the determination of the scale of a drawing when it is not known; and the selection of a suitable scale for a view or section to suit a given area on a drawing.

---

It is an object of the present invention to provide an inexpensive pocket size measuring and calculating instrument which will have a reasonably high degree of accuracy, one that will be easy to use and clearly reveal its result for a large number of engineering scaling and calculating operations; and to provide a variety of scales and range of measurement not available on other commonly used pocket size measuring instruments.

More specificlaly, the present invention provides a very simply constructed two-piece instrument consisting of an open-ended outer case and an inner slide received in the case on which are placed on a number of main scales, such as the common architect's scales and/or engineer's and metric scales; in which the case is designed to include one or more measuring windows, each measuring window being related to a specific group of scale windows also formed in the case and designed to reveal one of the main scales of the slide.

It is a further object of the present invention to provide a scaling instrument for use by engineers, draftsmen and people of like profession in which the instrument is provided with one or more measuring windows that permit a measurement to be made on a drawing, which measurement is related to one of a number of scale windows of the instrument, where the particular scale window that agrees with the scale of the drawings will quickly and accurately reveal the dimensional value of the measurement in terms of the relevant scale.

It is a further object of the present invention to provide an expandable type scaling instrument which will be at least an inch shorter than those in common use, so as to fit into a shirt pocket without protruding excessively, but yet capable of measuring a length almost twice its collapsed length. When constructed with an overall length of 5¾", for example, it can be extended to provide a usable measuring length of 10".

It is a still further object of the invention to provide a scaling instrument which is constructed as a very flat article so as to consist of essentially only two sides on which are formed a number of windows which are related by virtue of a slide to different scales, for example, the common architect's scales and/or engineer's scales.

It is a still further object of the present invention to provide in addition to a scaling instrument noted immediately above, a calculator and converter wherein the measuring windows and scale windows, through the manipulation of the slide and the use of convenient ratio factors, are employed to add, subtract, multiply and divide, and to convert dimensional values into different units of measurement and calibration.

These objects as well as various other features and advantages of the invention will be better understood when the following description is read along with the accompanying drawings of which:

FIGURE 1 is an elevational view of one side of a scaling device and calculator constructed in accordance with the teaching of the present invention, having its sliding member extended for clearer illustration;

FIGURE 2 is a view similar to FIGURE 1 showing the other side of the scale and calculator and with the slide element collapsed; and FIGURE 3 is an enlarged end view of the article illustrated in FIGURES 1 and 2.

With reference to FIGURE 1, there is illustrated a rectangular shaped case 10, having open ends on its two short sides. The case can be constructed of several inexpensive material, such as, paper, plastic and metal. The case is provided with measuring windows 11 and 12 formed on its opposite longitudinal sides, each measuring window being defined by a left index line 13 and right index line 14 which, as noted later on, are used in performing a scaling operation. As shown on the drawing, the upper window of the case 10 is identified as the B-measuring window by the letter B alongside its left index line 13. Likewise, the measuring window 12 is identified by the letter A alongside its left index line 13.

In referring to the right-hand side of the case 10, there appear at the extreme edge of the case the numerals ¼, ½ and 1 directly across from three superimposed windows 15, 16 and 17 formed in the casing and identified by the legend "B Scales," to associate them with the B-measuring window. These windows are designed to reveal separate main scales which may be any unit of measurement or calibration. In this case three frequently used architect's scales are shown, namely, the ¼, ½ and 1 inch equal one foot scales. Above each scale window 15, 16 and 17 there are shown subscales 18, 19 and 21 which, as noted, are divided into equal units, totaling one unit of measure of the particular main scale. To the left of the windows 15, 16 and 17 the case 10 is provided with a column identified as "BASE DIM," meaning base dimension, for which dimensions the values 20 feet, 10 feet and 5 feet are shown on the left-hand side of the respective windows. These values correspond to the distance between indices 13 and 14 of the B-measuring window. Adjacent to the BASE DIM column there is provided a RATIO column which has similarly related numbers, the numbers being 4, 2 and 1, and corresponding to the relative values of a dimension revealed simultaneously on these three scales and the three D-scales on the other side of the instrument.

At this point reference will be made to the slide 22 that is received in the open ends of the case 10 and being of the same length as the case. It should be noted first that the two longitudinal edges of the slide function as straight-edges. FIGURE 1 shows that at the top and bottom edges of the slide there are provided two pairs of spaced-apart arrows 23, 24 and 25, 26; the arrows 24 and 26 being preferably a different color, for example, red; than the arrows 23 and 25, which are preferably black. The arrows appear through the measuring windows 11 and 12 as do the numbers ¼, ½ and 1 through measuring window 11 to identify it with the B-scale windows and the numbers ³⁄₃₂, ⅛ and ³⁄₁₆ through measuring window 12 to identify it with the A-scale windows. Printed on the slide 22 are a number of architect's main scales 27, 28 and 29 arranged to show up in one of the B-scale windows 15, 16 and 17 and line up with one of the subscales 18, 19 and 21. The numbers on the main scales on the slide 22 appear in red and black, the black numbers, to the right of the scale divisions, relating to a measurement made at measuring window B from left index 13 to block arrow 23, sometimes referred to as a black range measurement, and the red numbers, to the left of the scale divisions, relating to a measurement made to the red arrow 24, which is referred to as a red range measurement.

In referring to the left-hand side of FIGURE 1, it will be appreciated that a similar relationship of unit measurements is provided for the A-scales and that they are used by turning the instrument in the same plane 180 degrees so that the window 12 appears in the same position that window 11 appears in FIGURE 1. The A-scales are provided with scale windows 31, 32 and 33 formed in the case 10 and with respect to each of these windows there are provided subscales 34, 35 and 36 which, in the illustration, again take the form of three of the common architectural scales. At this point, if reference is made to the slide 22, it will be seen that the slide is provided with a like number of main scales 37, 38 and 39 having both a series of red and black numbers, as in the case of the B-scales. These numbers are related so as to show up in the windows 31, 32 and 33 and be supplemented by the subscales 34, 35 and 36. The arrows of the A-measuring window have already been identified as 25 and 26 along with the numerals ³⁄₃₂, ⅛ and ³⁄₁₆ which define the particular group of associated A-scales. Accordingly, each A-scale window is related to one of these units of measurement and, as illustrated, the scale window 31 is defined as the ³⁄₁₆ window, the window 32 as the ⅛ scale window and the window 33 as the ³⁄₃₂ scale window.

As in the case of the B-scales, the base dimension of each scale appears when the instrument is turned 180 degrees at the left of each window; these being 48 feet, 36 feet and 24 feet. Adjacent to the base dimension column there is provided a ratio column having the numbers 16, 12 and 8, which correspond to the relative values of a dimension revealed simultaneously on these three scales and the three C-scales on the other side of the instrument.

As noted previously, the combined scaling device and calculator comprises six additional scales which will now be described. In this connection, reference will be made to FIGURE 2, which represents the other side of the instrument, in which measuring window D is directly behind measuring window A and measuring window C is directly behind measuring window B. In describing the D-scales, it will be appreciated that they, in every essential relattionship, are similar to the A and B scales, except for the top right-hand D-scale, designated "cm." This D-scale relates to the metric units of measurement. There are two sets of main scale divisions appearing in this window, one set beginning with the black number zero, as illustrated, which is used for black range measurements, and the other set, beginning with the red number 12, which is used for red range measurements. Both of these sets of main scale divisions are used in conjunction with the common subscale. This other side of the slide 22 has two pairs of spaced arrows 41, 42, 43 and 44 which are related to the left and right index lines 45 and 46 of the measuring windows 47 and 48. As in the case of the A- and B-scales, the case has the letter D appearing to the extreme left of the window 47. The case and slide are provided with legends relating the D-measuring window 47 to the D-scale windows 49, 51 and 52. Accordingly, the legend "cm., in., 10" appears on the slide 22 and shows through D-measuring window 47; the "cm." being the centimeter scale, the "in." the inch or full size scale and the "10" the engineer's, or one inch equals ten feet, scale. Above the three windows 49, 51 and 52 are located subscales 53, 54 and 55.

As partially shown in the scale windows in FIGURE 2, the particular main scale for each window is provided on the slide 22, which scales will again be expressed in both red and black numbers. The D-scales have a base dimension column in which connection the base dimension for the three windows 49, 51 and 52 are 12.7 centimeters, 5 inches and 50 feet, respectively. The windows 51 and 52 also have a ratio column having the numbers ¹⁄₁₂ and 10, respectively.

Turning to the last group of scales, namely, the C-scales, the C-measuring window 48 and arrows 43 and 44 have already been noted along with its index lines 45 and 46. The case 10 provides identification of the C-measuring and scale windows by the letter C and the legend C-scales, respectively, and also of the scales, namely, 1½, ¾ and ⅜, which numbers appear adjacent scale windows 56, 57 and 58 formed in the case 10 similar to the other three scale groups.

Above each window there are provided subscales 59, 61 and 62 and on the slide 22 there are provided main scales of the particular scales in question which appear in both red and black numerals. The C-scales also are provided with a base dimension column and a ratio column; the base dimensions being 3 feet, 6 feet and 12 feet and the ratio values being 1, 2 and 4 in the same order.

The smooth sliding, but firm movement of the slide 22 relative to the case 10 is obtained by the construction illustrated in FIGURE 3, in which it will be seen that the case 10 receives the slide 22 with a slight clearance between them. In a typical form of construction the case may be made of thin plastic sheeting having a gauge .010 inch thick and the slide of a slightly thicker material, say of the order of .020 inch thick. It will be appreciated that the case itself, aside from the windows, may be made up of an opaque material or it may be made of a transparent material with an opaque backing, in either case the windows of the case being open or transparent so that the various scales appearing on the slide will show through each window along with the arrows. It is important to note that the slide rule characteristic of the instrument derives from the relationship of the windows and the position of the scales so that a single measurement is simultaneously registered on six of the main scales.

Of the many uses of the above-described instrument, a few of the more important will now be described and illustrated in a series of examples.

As noted previously, the instrument can be used to obtain a dimensional value from a scaled drawing in which the scale of the drawing happens to be known. By choosing the measuring window that agrees with the known scale, the measurement is made using that measuring window in connection with the associated scale window. To illustrate a typical measurement, consider a dimension X on a drawing made to a scale of ½ inch=1 foot. The first step is to place the left index 13 of the B-measuring window 11 at the left end of dimension X. Assume that dimension X happens to be shorter than the distance between indices 13 and 14, i.e. less than the base dimension; therefore, adjust the slide 22 until the black arrow 23 coincides with the right end of the dimension X. Since the black arrow locates the terminus of the dimension X, the dimension is found by simply reading the black-range value for the scale division under the subscale 19 at the ½-scale window 16 plus the distance along the subscale 19 which that scale division traversed.

Thus, as shown in FIGURE 1, dimension X would be read at the ½-scale window as 3 feet-3 inches. All other scales are read in a similar manner.

Now consider the case when the dimension is so long that it extends beyond the right index 14, a dimension Y, for example. In this case and still working with measuring window B, the red arrow 24 is used to locate the terminus of the dimension Y and the red range value is read on the main scale 28 under the subscale 19 at the ½-scale window 16. As illustrated in FIGURE 1, dimension Y would be read as 13 feet-3 inches.

As noted previously, the instrument can be used for marking off and ruling a dimension and, also, as a calculator and converter. The latter uses include adding and subtracting scaled dimensions, multiplying and dividing, and converting dimensions to their decimal or metric equivalents. Some of these uses will now be given in several examples:

In referring first to the operation of marking off and ruling a dimension, let it be assumed that a dimension Y=75 feet-0 inch is given, and it is desired to represent this on the 1 inch=10 feet engineer's scale. The first step is to ascertain the correct measuring window, which, in this case, is the D-window 47 (FIGURE 2) which shows the numeral "10," associated with D-scale window 52. At this point the instrument is placed with the D-measuring window 47 up, as in FIGURE 2. The base dimension for the 10-scale window 52 is shown as 50 feet, which is less than the desired dimension, and hence, the setting must be made in the red range. The slide 22 is now moved until the red numeral 7 (representing 7 feet x 10 or 70 feet) lies under "5" on the subscale 55 of the 10-scale window 52. The dimension Y is now displayed as that distance between the left index 45 of the D-scale measuring window 47 and the red arrow 42. At this point the dimension can be marked off by placing the instrument on a sketch so that the left index 45 coincides with the point of origin of dimension Y and marking the right end of the dimension to match the red arrow 42 on the slide 22. The slide itself can be used as a straightedge to rule the line Y.

In taking up now the addition and subtraction operation, let it be assumed that it is desired to add two black-range measurements on a drawing of scale ¼ inch=1 foot. The first step is to select the measuring window which shows the "¼" scale. This is the B-window 11 shown in FIGURE 1. Next, the left index 13 of window 11 is placed at the left end of the first dimension and the slide 22 is extended until the black arrow 23 indicates the right end of the dimension. Without disturbing the slide, the instrument is now placed so that the black arrow 23 is aligned with the left end of the second dimension and the slide is then extended until the black arrow 23 coincides with the right end of the second dimension. If the second setting carries beyond the right index 14, the red arrow 24 will be used to complete the addition. At this point the black or red-range reading, whichever is applicable, is observed in the ¼-scale window 15. This value represents the sum of the two dimensions. It is important to note that the instrument allows one to actually measure around corners by using the above procedure.

Subtraction of scaled dimensions is performed in a similar manner, except that the longer dimension is measured first. Then, without disturbing the slide, the instrument is placed on the second (shorter) dimension so that the arrow used to measure the longer dimension is aligned with the right end of the shorter dimension. By moving the slide until the measuring arrow matches the left end of the shorter dimension, the difference is obtained.

As to the operations of multiplication and division, the instrument may be used as a special slide rule with sufficient accuracy for such applications as approximating lengths of material to be ordered or determining bolt spacings. Assume that one requires a number of pieces of angle iron, each 2 feet-8½ inches long and desires to determine the total length of angle iron to be ordered, first for 12 pieces and then for 18 pieces. The instrument is turned so that the C-measuring window 48 of FIGURE 2 is turned upright. Here, it will be noted, the numeral 1 in the ratio column to the left of the 1½ scale window 56 may be multiplied by the number of pieces (12) to yield a ratio of 12, which is the ratio for the "⅛" scale shown opposite window 32 on the reverse side of the instrument, i.e., the middle A-scale window of FIGURE 1.

Now, with the C-measuring window 48 still upright, the next step is to move the black-range numeral 2 to the 8½ inch mark on the subscale 59 at the 1½ scale window 56 of the C-scales. The instrument is then turned over to the A-scale side where 32 feet-6 inches is read (black-range) at the "⅛" scale window 32. This is the length required for 12 pieces. With the instrument so manipulated with the A-measuring window 12 upright, determination of the length to be ordered for 18 pieces can be made. It is to be noted that the ratio 8 for the "³⁄₁₆" scale window 31 may be multiplied by 18/12 (1.5) to yield a ratio of 12, which is again the ratio opposite the "⅛" scale window 32. The slide 22 can now be adjusted to reset the dimension 32 feet-6 inches on the "³⁄₁₆" scale (in the red-range, since it exceeds the base dimension 24 feet) and one may read 48 feet-9 inches in the red-range of the "⅛" scale in window 32. This is the length required for 18 pieces.

The instrument, as noted, can also be used to divide. Let it be assumed that it is desired to divide the dimension 13 feet-6 inches into 6 equal increments, and determine the increment lengths. The first step is to hold the instrument with the A-measuring window 12 upright. Then select a ratio which, when divided by the number of increments (six) yields a numerical value for which there is a ratio on the instrument. By choosing the ratio "12" at the ⅛-scale window 32 one obtains 12÷6=2 or the ratio for the "¾" scale of the C-scale window 57 on the reverse side. Now, with A-measuring window 12 still upright on the "⅛" scale, the slide 22 is moved to 13 feet-6 inches (black-range). After this, the instrument is turned over and the quotient, 2 feet-3 inches in the black-range is read on the "¾" scale in C-scale window 57. It will be appreciated that similar operations can be prepared on the A and C scales, using the following factors or their reciprocals: ⅔, ¾, 2, 3, 4, 6, 8, 12 and 16. Similarly, on the B and D scales, one may use the factors 6/10, 2, 4, 5, 10, 12, 24, 48 and 120 or their reciprocals. In addition, two factors can be combined in one calculation as in the multiplication example set forth before.

In now describing the conversion feature of the instrument, let it be assumed that one wants to determine the decimal and metric equivalents of 7½ inches and also the metric equivalent of 75 inches. The instrument is positioned so that the D-measuring window 47 is upright as in FIGURE 2. Next, the red-range value of 7½ inches is set on the "in" scale of window 51. 7.5 inches is then read on the "10" scale in window 52. For this type of conversion, one reads the 10-scale divisions in inches and the subscale in tenths of an inch. The metric equivalent of 7½ inches is read on the "cm." scale in window 49. Thus, red-range 19 cm. plus .05 cm. from the sub-scale are combined to obtain the total dimension 19.05 cm. (190.5 mm.). With the same setting one may also take the "10" scale reading as 75 inches and read the metric equivalent as 190.5 cm. (1.905 meters) on the "cm." scale of window 49. Assume now that it is desired to determine the decimal equivalent of 7 feet-6 inches. Here the instrument is positioned with the B-measuring window 11 upright as in FIGURE 1. Then, the red-range value of 7 feet-6 inches is set on the 1 inch=1 foot scale. After this step, the instrument is turned over bringing the D-scales upright and 7.5 feet at the 10-scale window 52 is read. For this example, the scale divisions are read in feet and subscale divisions are in tenths of a foot on the "10" scale.

By a system of combined operations, the instrument makes it vary easy to measure or mark off dimensions to the other common engineer's scales, for example, 1 inch=20, 30, 40, 50 and 60 feet. One example is given as follows:

If one wanted to rule a line 67 feet-4½ inches long to the engineer's scale 1 inch=30 feet, he should first divide the dimension by 3 by holding the instrument with the A-measuring window 12 upright. Then, 67 feet-4½ inches is set in the red-range on the "⅛" scale in window 32 and the instrument is turned over to obtain the reading 22 feet-4½ inches, or approximately 22.5 feet, on the "⅜" scale in C-scale window 58. Next, the instrument is rotated 180° in the same plane bringing the D-scale windows into the upright position. Using the "10" scale of window 52 as the 1 inch=10 foot scale, the black 2 (for 20 feet) is set under 2.5 feet on the subscale 55. Following this, the dimension can be marked off at the D-measuring window 47, and the slide 22 used to rule the desired length of line.

In addition to the above-noted uses of the instrument, its scale comparison feature may be employed to determine rapidly the scale of a drawing when the scale is not stated and to select a suitable scale for a view of section which must be fitted into a given area of a drawing.

In accordance with the provisions of the patent statutes, I have explained the principle and operation of my invention and have illustrated and described what I consider to represent the best embodiment thereof. However, I desire to have it understood that within the spirit of the invention, the invention may be practiced otherwise than as specifically illustrated and described.

I claim:

1. An instrument for scaling and calculating in units of measurement such as architectural and engineering dimensional values comprising:

a relatively thin rectangularly shaped case member, said case member being open on its short sides, the openings defining the ends of a continuous passageway through the case member, a slide member adapted to readily move in and out of either of said end openings and through said passageway, said slide having two straight edges formed at its opposed longitudinal edges, said case member being formed with two ruling edges formed at the termini of its two longest sides, two measuring windows formed at the opposed edges of each side of the case member adjacent the two ruling edges, at least one scale window for each measuring window formed in the case on the side of the case on which the releated measuring window is formed and in a manner to expose said passageway, a measuring mark located at one end of each measuring window and an equal number of associated marks located on the slide in a manner to be viewable through the associated measuring window, a number of main scales placed on said slide, each being related and arranged to be viewable through one of said scale windows, a subscale related to each scale window so that the main scale and the related subscale are registerable with a particular scale window, said subscales being subdivided into an equal number of units, and equaling a unit of the main scale, and the relationship between the measuring marks of the case and the slide with reference to the various main scales being such that for a given main scale the slide can be positioned so that the distance between the marks either represent a measurement of an unknown dimensional value which will be disclosed by one of the main scales or a measurement of a dimensional value as represented by any one of the main scales.

2. An instrument in accordance with claim 1 wherein multiplication and division operations are performed by use of a number of convenient ratio factors of the various main scales and wherein said ratio factors of at least several of the main scales are made to appear adjacent one or more of said scale windows.

3. An instrument in accordance with claim 1 wherein there are at least twelve scale windows formed on said case member which include at least three different sets of architect's scales, each set being related to one of said measuring windows, the relation of the scale and windows being such that a measurement registers in at least six main scales simultaneously.

4. An instrument in accordance with claim 3 wherein three of the scale windows relate to the metric, an additional architect's and engineer's scale, and wherein these three scales form a set which is related to one of said measuring windows.

5. An instrument in accordance with claim 1 wherein an additional measuring mark is placed on the outer end of said slide for each measuring window, each said main scale comprising two different sets of unit measurement, one set being related to the dimensional values falling within the range of the first and second measuring marks and the other set being related to the dimensional values falling within the range of the first and additional measuring marks.

6. An instrument in accordance with claim 4 wherein at least one of the limits of one of said range of movements of the measuring marks is defined on the case as a base dimension and the particular value of each base dimension is made to appear adjacent each scale window.

7. An instrument in accordance with claim 1 wherein said case member is constructed out of transparent plastic sheeting, an opaque backing member secured to said case member on which said measuring windows and scale windows are formed and wherein said slide is made up of opaque material.

8. An instrument in accordance with claim 6 wherein said slide is substantially the same length an said case.

References Cited

UNITED STATES PATENTS

| | | | |
|---|---|---|---|
| 844,536 | 2/1907 | Prindle | 33—161 |
| 1,215,441 | 2/1917 | Walker. | |
| 2,190,472 | 2/1940 | Ferrughelli | 235—70 |
| 2,331,298 | 10/1943 | Bennett | 33—103 |
| 2,468,191 | 4/1949 | Fullilove. | |
| 2,473,876 | 6/1949 | Goldstaub. | |
| 2,715,779 | 8/1955 | Hughson. | |
| 2,777,617 | 1/1957 | Matt | 235—70 |
| 2,874,478 | 2/1959 | Faulconer | 235—70 X |
| 3,091,389 | 5/1963 | Wiken | 235—61 |
| 3,229,905 | 1/1966 | Holmes. | |

RICHARD B. WILKINSON, Primary Examiner

S. A. WAL, Assistant Examiner

U.S. Cl. X.R.

33—107, 161; 235—70